United States Patent
Vinches et al.

(10) Patent No.: US 11,591,098 B2
(45) Date of Patent: Feb. 28, 2023

(54) NACELLE FORWARD PART OF A PROPULSION ASSEMBLY COMPRISING AN INCLINED STIFFENING FRAME

(71) Applicant: Airbus Operations S.A.S., Toulouse (FR)

(72) Inventors: Frédéric Vinches, Larra (FR); Arnaud Bourhis, Plaisance du Touch (FR); Julien Sentier, Colomiers (FR); Clément Breton, Toulouse (FR)

(73) Assignee: Airbus Operations S.A.S.

( * ) Notice: Subject to any disclaimer, the term of this patent is extended or adjusted under 35 U.S.C. 154(b) by 454 days.

(21) Appl. No.: 16/226,910

(22) Filed: Dec. 20, 2018

(65) Prior Publication Data

US 2019/0193833 A1 Jun. 27, 2019

(30) Foreign Application Priority Data

Dec. 21, 2017 (FR) ...................................... 1762720

(51) Int. Cl.
*B64D 33/02* (2006.01)
*B64D 29/08* (2006.01)

(52) U.S. Cl.
CPC ............. *B64D 29/08* (2013.01); *B64D 33/02* (2013.01); *B64D 2033/022* (2013.01); *B64D 2033/0286* (2013.01)

(58) Field of Classification Search
CPC .......... B64C 7/02; B64D 29/06; B64D 29/08; B64D 2033/022; B64D 33/02; B64D 2045/0095
See application file for complete search history.

(56) References Cited

U.S. PATENT DOCUMENTS

| 8,657,567 | B2* | 2/2014 | Cloft | ................... F02C 7/04 415/145 |
| 8,939,713 | B2* | 1/2015 | Blin | ................... B64D 29/00 415/119 |

(Continued)

FOREIGN PATENT DOCUMENTS

| DE | 102011103163 A1 | 12/2012 |
| EP | 1582702 A1 | 10/2005 |

(Continued)

OTHER PUBLICATIONS

FR 1762720 Search Report dated May 15, 2018.
European Search Report for Application No. EP 18214213 dated Feb. 7, 2019, 3 pages.

*Primary Examiner* — Richard Green
(74) *Attorney, Agent, or Firm* — Lerner, David, Littenberg, Krumholz & Mentlik, LLP

(57) ABSTRACT

A nacelle forward part of an aircraft propulsion assembly, includes an air inlet lip at the front end, an internal structure and an external panel extending the lip, and an annular stiffening frame formed around an axis of revolution and comprising an internal peripheral edge linked to the internal structure and an external peripheral edge linked to the external panel. The stiffening frame presents an inclination relative to the axis of revolution, its slope being oriented towards the front end of the nacelle forward part. The stiffening frame is configured to deviate, outside the nacelle of the propulsion assembly, an object striking the stiffening frame. The stiffening frame so configured is capable of withstanding the impacts of objects without breaking while enabling the object striking the stiffening frame to be deviated towards the exterior of the nacelle.

15 Claims, 3 Drawing Sheets

(56) References Cited

U.S. PATENT DOCUMENTS

| | | | |
|---|---|---|---|
| 9,938,852 B2* | 4/2018 | Lumbab | F01D 25/04 |
| 10,160,552 B2* | 12/2018 | Crawford | B64D 33/02 |
| 10,946,974 B2* | 3/2021 | Lebeda | B64D 33/02 |
| 2007/0278345 A1* | 12/2007 | Oberle | B64D 29/08 |
| | | | 244/53 R |
| 2009/0140104 A1* | 6/2009 | Surply | B64D 33/02 |
| | | | 244/53 B |
| 2010/0031629 A1* | 2/2010 | Vauchel | B64D 29/08 |
| | | | 60/226.1 |
| 2010/0124494 A1* | 5/2010 | Howarth | F02C 7/04 |
| | | | 415/213.1 |
| 2010/0252689 A1* | 10/2010 | Vauchel | B64D 29/08 |
| | | | 244/53 B |
| 2010/0260602 A1* | 10/2010 | Binks | B64D 29/08 |
| | | | 415/214.1 |
| 2010/0314501 A1* | 12/2010 | Vauchel | F02C 7/04 |
| | | | 244/53 B |
| 2011/0014044 A1* | 1/2011 | Vauchel | B64D 29/06 |
| | | | 415/214.1 |
| 2011/0131945 A1 | 6/2011 | Vauchel et al. | |
| 2011/0182727 A1* | 7/2011 | Vauchel | B64D 29/06 |
| | | | 415/213.1 |
| 2011/0214405 A1* | 9/2011 | Joret | B64D 29/08 |
| | | | 60/39.11 |
| 2012/0090694 A1* | 4/2012 | Porte | B64D 33/02 |
| | | | 137/15.1 |
| 2012/0118400 A1* | 5/2012 | Bouillon | B29C 70/48 |
| | | | 137/15.1 |
| 2014/0147268 A1* | 5/2014 | Porte | B64D 33/02 |
| | | | 415/213.1 |
| 2015/0129045 A1* | 5/2015 | Kane | F02C 7/04 |
| | | | 137/15.1 |
| 2015/0260104 A1* | 9/2015 | Wilson | B64D 33/02 |
| | | | 60/796 |
| 2016/0251085 A1* | 9/2016 | Stark | B64D 33/02 |
| | | | 244/53 R |
| 2016/0356180 A1* | 12/2016 | Bol | F01D 21/045 |
| 2016/0375988 A1* | 12/2016 | Brown | B64C 21/06 |
| | | | 244/53 B |
| 2016/0377090 A1* | 12/2016 | Brown | B64D 29/00 |
| | | | 415/9 |
| 2017/0036772 A1* | 2/2017 | Faugeras | B64F 5/60 |
| 2017/0096238 A1 | 4/2017 | Porte et al. | |
| 2017/0233090 A1* | 8/2017 | Crawford | F02C 7/04 |
| | | | 415/220 |
| 2018/0105281 A1* | 4/2018 | Porte | F02C 7/045 |
| 2018/0142645 A1* | 5/2018 | Lu | F02K 1/82 |
| 2018/0170566 A1* | 6/2018 | Paolini | B64D 29/06 |
| 2018/0194485 A1* | 7/2018 | Chilukuri | B64D 15/04 |
| 2018/0297713 A1* | 10/2018 | Schrell | B64D 33/02 |
| 2020/0290747 A1* | 9/2020 | Delsol | B64C 3/28 |

FOREIGN PATENT DOCUMENTS

| | | |
|---|---|---|
| EP | 3103723 A1 | 12/2016 |
| FR | 3055922 A1 | 3/2018 |
| WO | 2010012899 A2 | 2/2010 |

* cited by examiner

NACELLE FORWARD PART OF A PROPULSION ASSEMBLY COMPRISING AN INCLINED STIFFENING FRAME

FIELD OF THE INVENTION

The present invention relates to the aircraft propulsive assemblies and more particularly the nacelles of aircraft propulsive assemblies.

BACKGROUND OF THE INVENTION

A propulsive assembly is a device making it possible to generate a thrust, which constitutes the motive force of the aircraft equipped with the propulsive assembly. An aircraft propulsive assembly is represented by way of example in FIG. 1.

The nacelle conventionally comprises an air inlet-forming anterior part P1.

The role of the anterior part P1 is to collect the air so as to ensure a regular flow to the fan.

The nacelle also comprises a main part P2 constituting the rest of said nacelle.

The propulsive assembly extends around an axis hereinafter called longitudinal axis A.

A conventional structure of the anterior part of an aircraft propulsive assembly nacelle, as known in the state of the art, is described with reference to FIG. 2.

The anterior part P1 of the nacelle comprises an air inlet lip 1, that can be annular or substantially annular and which is arranged at its front end.

Throughout the present document, the notions of "front" and "rear", "anterior" and "posterior" as well as "upstream" and "downstream" are understood according to the direction of the air flow in the propulsive assembly. Thus, the air enters through the front of the propulsive assembly, that is to say through the anterior part P1 of the nacelle and emerges (after a part of the air has served as fuel) through the rear of the propulsive assembly, that is to say through the rear end of the main part P2.

In the conventional structure of an anterior part P1 of the propulsive assembly, a front frame 2 is arranged at the rear of the air inlet lip 1. An inner structure 3, comprising a sound-proofing panel, extends the air inlet lip 1 toward the rear of an inner surface 11.

An outer panel 4 extends an outer surface 12 of the air inlet lip 1 toward the rear.

A rigidifying frame 5, also called rear frame, is moreover arranged at a rear end of the anterior part P1 of the nacelle and links the outer panel 4 to the inner structure 3.

The rigidifying frame 5 thus defines the limit between the anterior part P1 and the main part P2 of the nacelle.

An engine flange 6, represented in FIG. 2 although not forming part of the anterior part P1 of the nacelle, makes it possible to link the rigidifying frame 5 to the engine of the propulsive assembly, that is to say to the assembly comprising the fan and the jet engine, and in particular to link the anterior part P1 of the nacelle to a fan compartment. The engine flange 6 is in particular linked to a rear flange 7 of the rigidifying frame 5.

Generally, the front frame 2 and the rigidifying frame 5 are both arranged in a direction at right angles to the longitudinal axis of the propulsive assembly. The longitudinal axis may thus coincide with an axis of revolution of the front frame or of the rigidifying frame 5.

In the various flight phases of an aircraft, events impacting the propulsive assembly can occur.

It may be for example that birds or external objects enter into collision with the aircraft and in particular with one of its propulsive assemblies. These collisions, and in particular the avian collisions, can damage the propulsive assemblies.

In the state of the art, in case of collision of a bird or of an object with the nacelle of the propulsive assembly, the structure previously described undergoes this collision. The structure is then dimensioned to absorb significant impacts.

Upon an impact, for example that of an avian collision at the air inlet lip 1 of the nacelle N, the bird strikes the front frame 2 then, if it passes through the front frame 2 in case of violent front-end impact, the rigidifying frame 5.

Thus, the front frame 2 and the rigidifying frame 5 are dimensioned to absorb a significant amount of energy. Such dimensioning has negative consequences on the weight and the cost of production of the frames.

Furthermore, with the structures of nacelle anterior parts known in the state of the art, the object or the bird that has entered into collision with the air inlet lip 1 may be trapped and remain blocked in the anterior part of the nacelle, which can prove damaging.

The risk of impact with the air inlet lip and the risk of blocking of an object in the anterior part P1 of the propulsive assembly are increased with the propulsive assemblies with high bypass ratio.

BRIEF SUMMARY OF THE INVENTION

Aspects of the present invention may resolve at least one of the abovementioned drawbacks. For that, an aspect of the invention proposes an anterior part of a nacelle of an aircraft propulsive assembly having an optimized structure.

Thus, an aspect of the invention relates to an anterior part of a nacelle of an aircraft propulsive assembly, the anterior part having a front end allowing the inlet of air and a rear end, the anterior part comprising:
- an air inlet lip arranged at the front end,
- an inner structure extending an inner surface of the air inlet lip,
- an outer panel extending an outer surface of the air inlet lip,
- an annular rigidifying frame around an axis of revolution, the rigidifying frame being arranged at the rear end of the anterior part and linking the outer panel to the inner structure, the rigidifying frame comprising an inner peripheral edge linked to the inner structure and an outer peripheral edge linked to the outer panel.

According to an embodiment of the invention, the rigidifying frame has an inclination relative to the axis of revolution of the rigidifying frame, such that the rigidifying frame has a slope oriented toward the front end of the anterior part of the nacelle, said rigidifying frame being configured to deflect out of the nacelle of the propulsive assembly an object entering through the front end of the anterior part and striking said rigidifying frame.

The inclination of the rigidifying frame allows it to withstand the impacts of objects without breaking while making it possible to deflect the object striking the rigidifying frame out of the nacelle. In fact, when an object enters into the anterior part of the nacelle by passing through the air inlet lip, the object strikes the rigidifying frame then, by virtue of the orientation of the slope, it is deflected out of the nacelle.

Furthermore, the inclination of the rigidifying frame makes it possible to reduce the longitudinal component of the impact of the object against the rigidifying frame.

Finally, the structure of the anterior part of the nacelle can be simplified since it is possible, in many cases to dispense with the use of a front frame in addition to the rigidifying frame as is the case in the prior art.

The anterior part can comprise a rear flange comprising a front end and a rear end. The front end is fixed to the inner peripheral edge of the rigidifying frame, and the rear end is adapted to be fixed to an engine flange of the fan compartment.

The rear flange can be deformable under the effect of an impact of the same direction as the axis of revolution of the rigidifying frame.

The anterior part of a nacelle can comprise a fixing part made of titanium or titanium alloy ensuring the link between the front end of the rear flange and the inner peripheral edge of the rigidifying frame.

The inclination of the rigidifying frame relative to its axis of revolution can lie between 10° and 45° and preferably between 20° and 40°, in particular 30°.

The rigidifying frame can be produced in composite material.

The rigidifying frame can have a substantially domed form.

The anterior part can be without a front frame.

The outer peripheral edge of the rigidifying frame can be linked to the outer panel by an interface ring.

The rigidifying frame and the interface ring can form a first angle greater than or equal to 120° and less than 180°.

The first angle can lie between 120° and 170°.

The interface ring can have a width of between 20 and 150 millimeters and preferably between 60 and 80 millimeters, in particular 70 millimeters.

The interface ring can have a thickness of between 1 and 3 millimeters.

The interface ring can be produced in metal, notably in aluminum, aluminum alloy or in titanium.

The invention relates also to an aircraft propulsive assembly comprising a nacelle, the nacelle comprising an anterior part as defined above.

Other particular features and advantages of the invention will become more apparent from the following description.

BRIEF DESCRIPTION OF THE DRAWINGS

In the attached drawings, given as nonlimiting examples.

DETAILED DESCRIPTION

Figure 1:
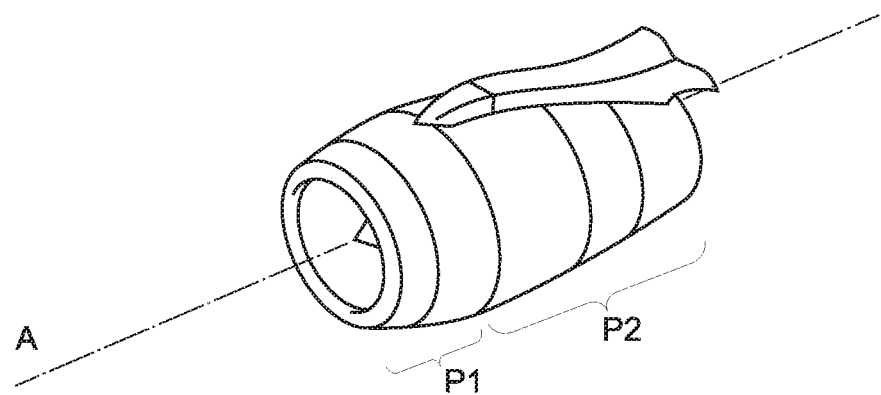
FIG. 1 represents, by a three-dimensional schematic view, an aircraft propulsive assembly.
Figure 2:
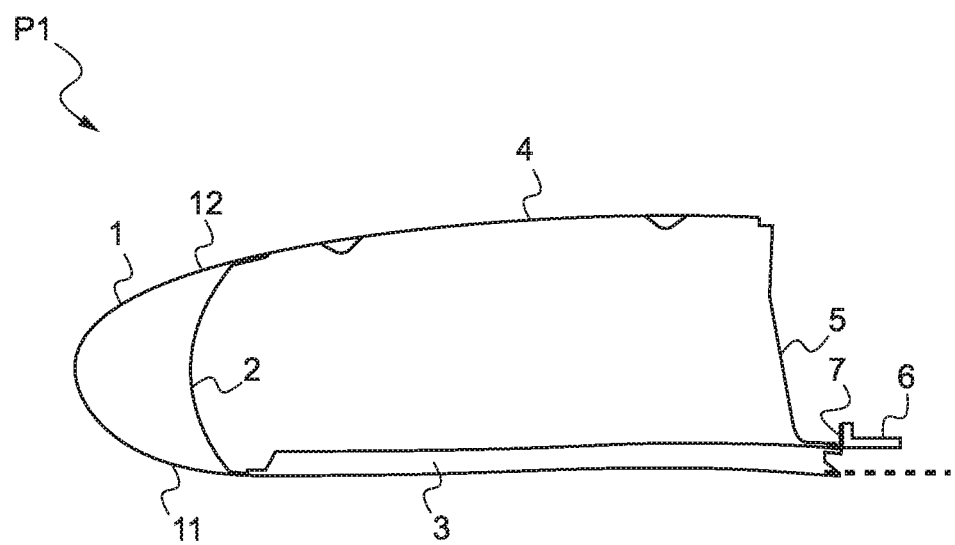
FIG. 2 represents, by a cross-sectional theoretical view, an anterior part of a nacelle of an aircraft propulsive assembly according to the prior art.

FIGS. 1 and 2, respectively showing generalities concerning aircraft propulsive assemblies and a configuration of an anterior part of a nacelle according to the state of the art have been described above in the preamble of the present document.

Figure 3:
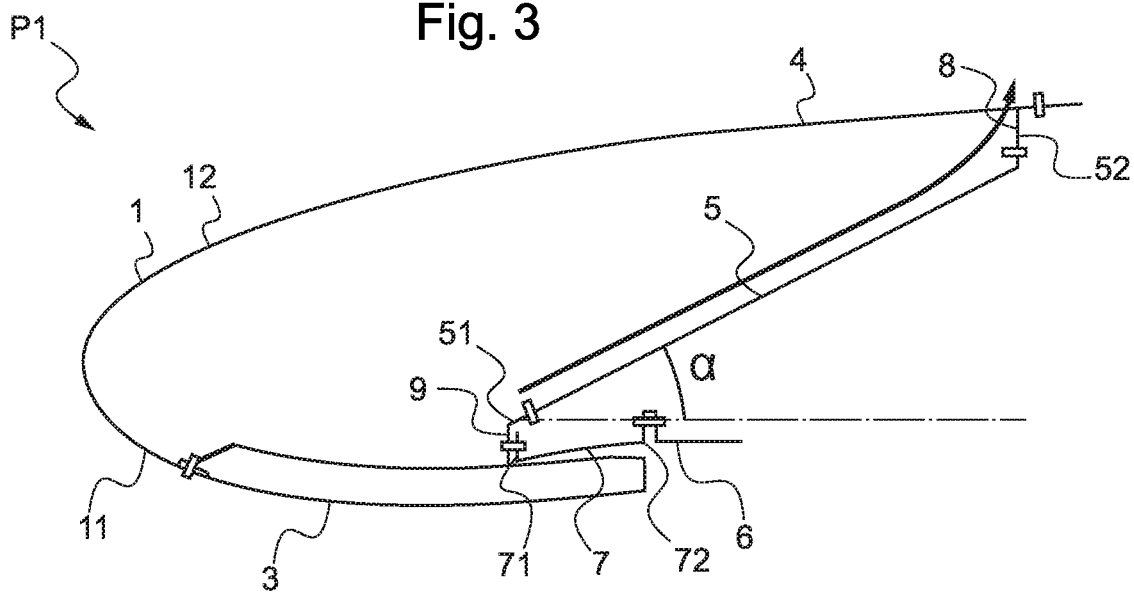
FIG. 3 represents, by a view identical to that of FIG. 2, the anterior part of a nacelle of a propulsive assembly according to an embodiment of the invention.
Figure 4:
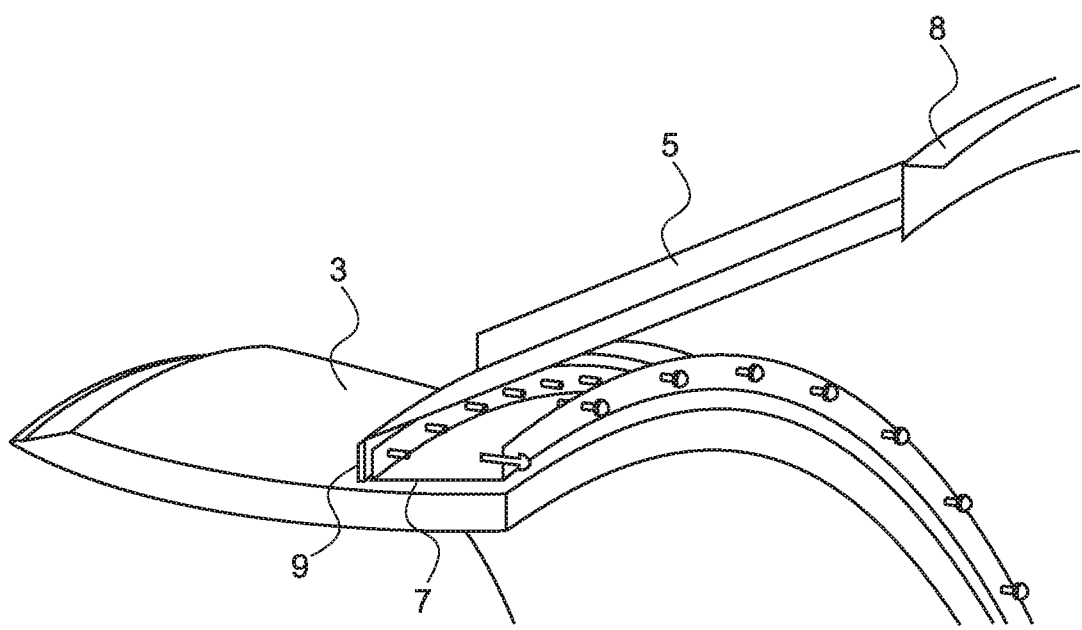
FIG. 4 represents, by a partial three-dimensional view in cross section, an anterior part of a propulsive assembly according to the embodiment illustrated in FIG. 3.

FIGS. 3 and 4 represent an anterior part P1 of a nacelle of a propulsive assembly according to an embodiment according to the invention.

The anterior part P1 is a structure substantially of revolution about the longitudinal axis A of the propulsive assembly that it is intended to equip. FIG. 3 represents only a section of this structure that is substantially of revolution.

The configuration presented corresponds in particular to an anterior part of an engine nacelle of UHBR type. A UHBR engine has a bypass ratio (mass ratio between the secondary flow and the primary flow) greater than or equal to fifteen. Such an engine has a nacelle of large dimension, in particular of larger diameter than the diameters of the propulsive assemblies currently employed on commercial aircraft.

The present invention is particularly suited to the propulsive assemblies having such geometrical characteristics.

The anterior part P1 of the nacelle of the aircraft propulsive assembly represented in FIG. 3 comprises an air inlet lip 1. Although represented schematically by a simple line in FIG. 3, the air inlet lip 1 is a physical piece which defines the leading edge of the anterior part P1 of the nacelle and therefore the leading edge of the aerodynamic fairing formed by the nacelle once the latter is constructed with said anterior part P1.

The air inlet lip 1 forms the front end of the anterior part P1 of the nacelle. It has a closed, substantially annular form, but is not necessarily perfectly circular (of revolution).

According to the embodiment described, the air inlet lip 1 has an inner surface 11 and an outer surface 12.

The inner surface 11 of the air inlet lip 1 is extended by an inner structure 3. The inner structure 3 comprises in particular a panel which forms the inner aerodynamic surface of the anterior part P1 of the nacelle, channeling the air flow entering into the nacelle. The inner structure 3 has an important acoustic role, in order to limit the noise emitted by the propulsive assembly. The inner structure 3 can in particular comprise a sound-proofing panel, known in the state of the art, having a configuration that makes it possible to avoid the transmission of the acoustic waves and to favor the absorption thereof.

The outer surface 12 of the air inlet lip 1 is extended by an outer panel 4. The outer panel 4 forms the outer aerodynamic surface of the anterior part P1 of the nacelle. When the nacelle is constructed, the outer panel 4 is itself extended at the main part P2 in order to form the outer aerodynamic surface of the nacelle, which is in particular configured to limit the aerodynamic drag.

Compared to the structure known in the state of the art and described with reference to FIG. 2, the structure of the anterior part P1 of FIG. 3, corresponding to an exemplary embodiment of the invention, has no front frame.

The anterior part P1 comprises a rigidifying frame 5 arranged at the rear end of the anterior part P1. The rigidifying frame constitutes an important structural element of the anterior part of the nacelle.

The rigidifying frame 5 has many functions, linked to the mechanical strength of said anterior part of the nacelle.

In particular, the rigidifying frame 5 is intended to be linked to the engine of the propulsive assembly. Engine should be understood generally to mean the propulsion means which are included in the nacelle once the latter is constructed. The engine generally comprises a jet engine and a fan driven by the jet engine. The rigidifying frame 5 can in particular be linked to a fan compartment, that is to say to a casing of the fan.

The rigidifying frame 5 serves as a link between the walls of the anterior part of the nacelle, that is to say as a link between the outer panel 4 and the inner structure 3. The rigidifying frame 5 comprises an inner peripheral edge 51 linked to the inner structure 3 and an outer peripheral edge 52 linked to the outer panel 4. These links can be produced by riveting.

According to the embodiment illustrated, the outer peripheral edge 52 of the rigidifying frame 5 is linked to the outer panel 4 by an interface ring 8.

The interface ring serves as damper in the deflection of an object having struck the rigidifying frame 5. Damper should be understood to mean an element adapted to absorb, for example by deformation, all or part of the impact energy.

The interface ring 8 has a crown ring form having an outer perimeter and an inner perimeter. The interface ring 8 is substantially flat. In other words, the interface ring 8 has a thickness that is substantially constant.

According to the embodiment represented in FIGS. 3 and 4, the interface ring 8 extends substantially at right angles to the axis of revolution A. In the exemplary embodiment of FIG. 5, the interface ring 8 has a different inclination relative to the axis of revolution A.

Figure 5:
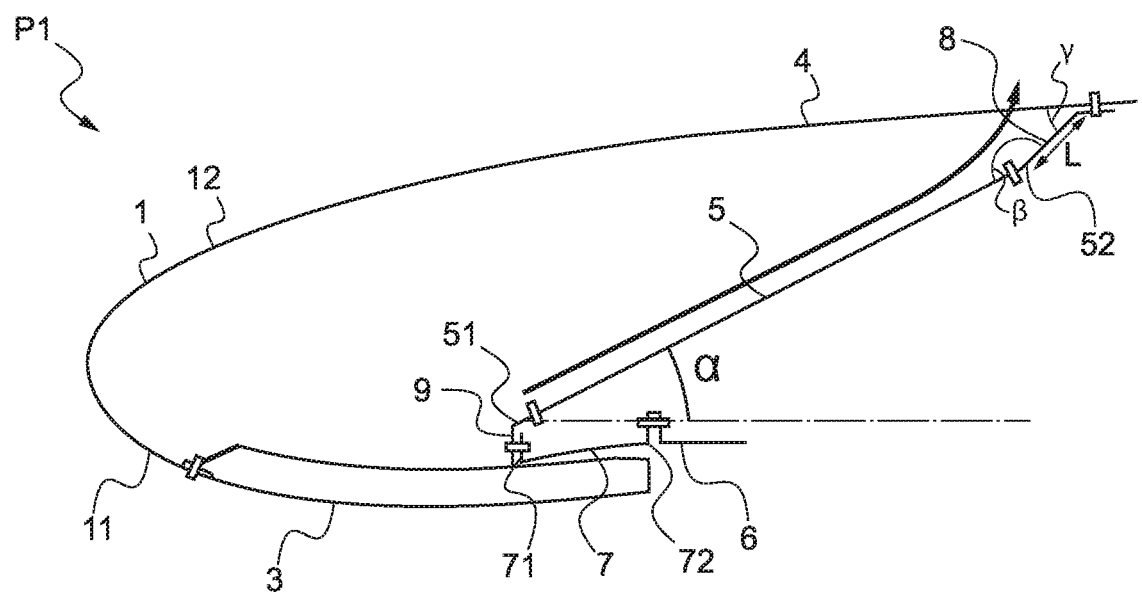
FIG. 5 represents, by a view identical to those of FIGS. 2 and 3, the anterior part of a nacelle of a propulsive assembly according to another embodiment of the invention.

As illustrated in FIG. 5, the rigidifying frame 5 and the interface ring 8 form a first angle β. The first angle β can lie between 120° and 180°. The interface ring 8 and the outer panel 4 form a second angle γ. The second angle γ can lie between 20° and 40°.

Preferably, the interface ring 8 does not extend in the continuity of the rigidifying frame 5. In other words, the first angle β is less than 180°, and for example lies between 120° and 170°.

Such an arrangement of the interface ring 8 and in particular an inclination such that the first angle β is greater than or equal to 120° and less than 180° facilitates the evacuation out of the nacelle of an object striking the rigidifying frame 5.

The interface ring 8 is dimensioned so as to ensure the role of damper. The interface ring 8 can have a width L of between 20 and 150 millimeters. Preferably, the interface ring 8 has a width L of between 60 and 80 millimeters, in particular 70 millimeters. The interface ring 8 can have a thickness of between 1 and 3 millimeters.

Width of the interface ring is understood to mean the distance between the outer perimeter and the inner perimeter.

The interface ring 8 can be produced in metal, for example in aluminum, aluminum alloy or in titanium. The use of such metals makes it possible to obtain an interface ring that is lightweight and resistant to impacts.

The linking of the anterior part P1 of the nacelle with the engine is ensured via two flanges linked to one another. A rear flange 7 allows the link between the rigidifying frame 5 and an engine flange 6 (which does not form part of the anterior part P1 of the nacelle), which is fixed to the engine of the propulsive assembly.

As can be seen in FIG. 3, the rear flange 7 comprises a front end 71 and a rear end 72. The front end 71 is fixed to the inner peripheral edge 51 of the rigidifying frame 5 and to the inner structure 3. The rear end 72 is fixed to the engine flange 6 of the fan compartment.

The abovementioned links can be produced by rivets.

In case of direct impact by an object, the rear flange 7 makes it possible to absorb the energy of the object and to protect the engine flange 6. The rear flange 7 acts in particular as damper upon a direct impact with an object, that is to say upon an impact in the same direction as the longitudinal axis A of the propulsive assembly.

In the exemplary embodiments described, the rear flange 7 has a U-shaped section. However, obviously, the rear flange 7 can have any other suitable form, or different dimensions.

Preferably, the rear flange 7 is made of ductile material, which allows it to have a plastic deformation without rupture.

According to the exemplary embodiments illustrated, a fixing piece 9 allows the link between the rigidifying frame 5 and the rear flange 7.

The fixing piece 9 can be made of titanium in order to avoid the corrosion between the composite of the rigidifying frame 5 and the aluminum of the rear flange 7. Titanium has in particular a good resistance to corrosion in addition to the mechanical properties, in particular ductility, suitable for allowing it to absorb the energy of an impact.

The fixing piece 9 can have various forms. The fixing piece 9 can in particular be shaped so as to favor its deformation without rupture, in order to increase the energy that it can absorb in case of impact.

As can be seen in FIGS. 3 and 4, the rigidifying frame 5 has an inclination relative to the longitudinal axis A. The rigidifying frame 5 is inclined such that the rigidifying frame has a slope oriented toward the front of the anterior part of the nacelle. Typically, the distance separating the inner peripheral edge 51 from the air inlet lip 1 is smaller than the distance separating the outer peripheral edge 52 from the air inlet lip 1. An angle of inclination α is illustrated in FIG. 3.

The angle of inclination α is, here, plotted between an axis parallel to the longitudinal axis A and the rigidifying frame 5. The angle of inclination α formed between the rigidifying frame and the longitudinal axis A (or an axis parallel to the longitudinal axis A), measured toward the rear of the anterior part of the nacelle as represented in FIG. 3, is thus an acute angle.

According to a preferential range, the inclination of the rigidifying frame 5 relative to the longitudinal axis A, that is to say the value of the angle of inclination α, is between 10° and 45°. In particular, the inclination of the rigidifying frame 5 relative to the longitudinal axis A can be between 20° and 40°.

The angle of inclination α can in particular be of the order of 30° or equal to 30°.

The inclination of the rigidifying frame 5 makes it possible, upon a collision, to deflect the object having struck the rigidifying frame 5 out of the nacelle.

An arrow represented in FIG. 3 illustrates the trajectory that an object would follow if it were to strike the rigidifying frame 5. As can be seen in the figure, the object strikes the rigidifying frame 5, follows the direction of the inclined rigidifying frame 5 to be then deflected out of the nacelle.

The inclination of the rigidifying frame 5 therefore makes it possible to avoid having an object introduced into the engine part and remaining trapped in the nacelle. The drawbacks stated above are thus obviated.

Furthermore, upon an object impact against the rigidifying frame, a part of the energy of the object is absorbed by the rigidifying frame 5. The inclination of the rigidifying frame makes it possible to reduce the energy absorbed following a collision by comparison to the prior art in which the rigidifying frame is at right angles to the longitudinal axis A.

However, although the energy absorbed is reduced by virtue of the inclination of the rigidifying frame 5, the latter is configured so as to have a great rigidity making it possible to deflect the object without breaking, but also preferentially so as to withstand stresses other than those from impacts of objects. Indeed, the rigidifying frame 5 must for example withstand the loads deriving from the main part P2 to which it is linked but also be able to withstand, as far as possible, a loss of a blade or even a great pressure differential in case of the breakdown of ducts present in the nacelle equipped with the rigidifying frame 5.

For this, the rigidifying frame 5 can be produced in a composite material. For example, the rigidifying frame 5 can be produced in a thermoplastic material having a great rigidity.

According to an exemplary production method, the rigidifying frame 5 can be produced from a smooth sheet. Several portions are then fabricated by thermo-molding from the smooth sheet using a domed rig. The portions are clipped to one another. Thermoplastic is finally over-injected along the periphery of the end of the smooth sheet.

The over-injection of thermoplastic allows the rigidifying frame 5 to withstand the beating and to obtain a final slope without machining rework.

The industrial method described above also makes it possible to have a high production rate.

In addition, in order to improve the deflection of the object, the rigidifying frame can have a substantially domed form.

Obviously, the present invention is not limited to the embodiments described above.

The events cited in the above description do not constitute the only risk of damage for the propulsive assemblies. Indeed, other risks, linked in particular to the external environment, have to be taken into account in the dimensioning of the frames of the upstream part of the nacelle.

As an example, icing constitutes a risk of damage for the fan and the jet engine. Thus, when the de-icing of the propulsive assembly is not performed electrically, the air inlet lip 1 can include a de-icing system.

Moreover, the interface ring 8 can have a shape and dimensions that are different. As an example, the interface ring 8 can be longer than is represented, in order to be flexible and thus improve the impact damping properties.

Alternatively, the outer peripheral edge 52 of the rigidifying frame 5 can be linked directly to the outer panel 4, without the use of an interface ring 8.

The anterior part P1 of the nacelle can comprise a front frame linked to the air inlet lip 1.

The invention thus proposes an anterior part structure of a nacelle of an aircraft propulsive assembly that is optimized for the nacelles of large dimension, in particular of large diameter. That concerns in particular the nacelles for engines with very high bypass ratio.

The inclination of the rigidifying frame allows it to withstand the impacts of objects without breaking while making it possible to deflect the object out of the nacelle.

The rigidifying frame is configured to have high mechanical specifications, in particular concerning resistance to the stresses, external and internal, to the nacelle.

In the context of a propulsive assembly of UHBR type, or of a propulsive assembly with electric de-icing (of UHBR type or not), that makes it possible to dispense with the front frame and thus to reduce the complexity of the structure of the air inlet formed by the anterior part of the nacelle. The potential elimination of the front frame makes it possible in fact to eliminate the fixings of the front frame to the air inlet lip. It is thus possible to reduce the aerodynamic disturbances that can be caused by the presence of these fixings which are close to the front end of the nacelle.

If, however, the anterior part of the front frame comprises a front frame particularly for protection against icing, the structure of the anterior part of the nacelle is still simplified. Indeed, in this embodiment, the front frame is essentially dimensioned to ensure the de-icing function since the rigidifying frame is configured to withstand the impacts and other mechanical stresses. That considerably reduces the weight and the complexity of the front frame, and consequently of the anterior part of the nacelle.

The invention claimed is:

1. An anterior part of a nacelle of an aircraft propulsive assembly, said anterior part having a front end allowing the inlet of air and a rear end, said anterior part comprising:
   an air inlet lip arranged at said front end;
   an inner structure extending an inner surface of the air inlet lip;
   an outer panel extending an outer surface of the air inlet lip, the outer panel forming an outer aerodynamic surface of the anterior part;
   an annular rigidifying frame around an axis of revolution, said rigidifying frame arranged at said rear end of said anterior part and linking said outer panel to said inner structure, said rigidifying frame comprising an inner peripheral edge linked to said inner structure and an outer peripheral edge linked to said outer panel; and
   a rear flange comprising a front end and a rear end, said front end fixed to said inner peripheral edge of said rigidifying frame, said rear end adapted to be fixed to an engine flange,
   wherein said rigidifying frame has an inclination relative to the axis of revolution, such that the rigidifying frame has a slope oriented toward the front end of said anterior part of the nacelle, said rigidifying frame configured to deflect out of the nacelle of the propulsive assembly, towards the outer aerodynamic surface, an object entering through the front end of the anterior part and striking said rigidifying frame
   wherein the outer peripheral edge of the rigidifying frame is linked to said outer panel by an interface ring, and wherein the interface ring does not extend in continuity of the rigidifying frame.

2. The anterior part of a nacelle according to claim 1, wherein the rear flange is deformable under the effect of an impact of the same direction as said axis of revolution of said rigidifying frame.

3. The anterior part of a nacelle according to claim 1, further comprising a fixing part made of titanium or titanium alloy ensuring a link between said front end of said rear flange and said inner peripheral edge of said rigidifying frame.

4. The anterior part of a nacelle according to claim 1, wherein the inclination of the rigidifying frame relative to its axis of revolution lies between 10° and 45°.

5. The anterior part of a nacelle according to claim 1, wherein the rigidifying frame is made of composite material.

6. The anterior part of a nacelle according to claim 1, wherein the rigidifying frame has a substantially domed form.

7. The anterior part of a nacelle according to claim 1, wherein there is no frame forward of the rigidifying frame.

8. The anterior part of a nacelle according to claim 1, wherein the interface ring has a width of between 20 and 150 millimeters.

9. The anterior part of a nacelle according to claim 1, wherein the interface ring has a thickness of between 1 and 3 millimeters.

10. The anterior part of a nacelle according to claim 1, wherein the interface ring is made of a metal.

11. The anterior part of a nacelle according to claim 10 wherein the interface ring is made of aluminum, aluminum alloy or titanium.

12. An aircraft propulsive assembly comprising a nacelle, said nacelle comprising an anterior part according to claim 1.

13. The anterior part of a nacelle according to claim 1, wherein the rigidifying frame and the interface ring forming a first angle ($\beta$) less than 180°.

14. The anterior part of a nacelle according to claim 13, wherein the rigidifying frame and the interface ring form a first angle ($\beta$) greater than or equal to 120° and less than 180°.

15. The anterior part of a nacelle according to claim 14, wherein the first angle ($\beta$) lies between 120° and 170°.

* * * * *